(12) United States Patent
Burczyk et al.

(10) Patent No.: US 6,752,021 B2
(45) Date of Patent: Jun. 22, 2004

(54) RELATIVE PRESSURE MEASURING INSTRUMENT

(75) Inventors: Dietfried Burczyk, Teltow (DE); Thomas Velten, Reifenberg (DE); Tanja Stöcklin, Lörrach (DE)

(73) Assignee: Endress + Hauser GmbH & Co. KG, Maulburg (DE)

( * ) Notice: Subject to any disclaimer, the term of this patent is extended or adjusted under 35 U.S.C. 154(b) by 0 days.

(21) Appl. No.: 10/195,148

(22) Filed: Jul. 15, 2002

(65) Prior Publication Data

US 2003/0024321 A1 Feb. 6, 2003

(30) Foreign Application Priority Data

Jul. 14, 2001 (DE) .......................................... 101 34 359

(51) Int. Cl.⁷ ................................................. G01L 9/00
(52) U.S. Cl. ....................................................... 73/717
(58) Field of Search ........................... 73/717, 756, 715, 73/708, 706, 720

(56) References Cited

U.S. PATENT DOCUMENTS

| | | | | |
|---|---|---|---|---|
| 4,685,469 A | * | 8/1987 | Keller | 600/488 |
| 5,847,282 A | * | 12/1998 | Keller | 73/706 |
| 6,425,291 B1 | * | 7/2002 | Flogel | 73/729.1 |
| 6,499,352 B2 | * | 12/2002 | Banholzer et al. | 73/715 |
| 6,516,670 B2 | * | 2/2003 | Hegner et al. | 73/715 |
| 6,581,469 B2 | * | 6/2003 | Burczyk et al. | 73/716 |

OTHER PUBLICATIONS

US 2001/0015105 Gerst et al Aug. 23, 2001.*

* cited by examiner

Primary Examiner—Edward Lefkowitz
Assistant Examiner—Andre Allen
(74) Attorney, Agent, or Firm—Bacon & Thomas, PLLC; Felix J. D'Ambrosio

(57) ABSTRACT

A relative pressure measuring instrument has a reference pressure feed that offers a high measure of safety and is easy to produce. Included is a relative pressure measuring cell having a pressure sensitive element, on whose process-facing side there is present during operation a pressure (p) to be measured, on whose process-averted side there is present during operation a reference pressure ($p_R$) to which the pressure (p) to be measured is to be referred, a support on which the relative pressure measuring cell is arranged and which is enclosed in a housing, a process connection, that is connected to a process-facing end of the housing, a measuring instrument housing that is arranged at a process-averted end of the housing, and a reference pressure feed through which during operation the reference pressure ($p_R$) is led to the process-averted side of the pressure sensitive element, and which leads completely out of the relative pressure measuring instrument laterally through the support and a single bore through the housing.

7 Claims, 2 Drawing Sheets

RELATIVE PRESSURE MEASURING INSTRUMENT

TECHNICAL FIELD

The invention relates to a relative pressure measuring instrument. A relative pressure measuring instrument is used to detect a pressure p to be measured with reference to a reference pressure $p_R$. The pressure thus measured is denoted as relative pressure. As an example, an atmospheric pressure that prevails in an environment of a measuring point serves as reference pressure, for example.

BACKGROUND OF THE INVENTION

Relative pressure measuring instruments are used in virtually all branches of industry for measuring relative pressures. The measured relative pressure values are used, for example, to control, regulate and/or monitor an industrial production process and/or processing procedure.

Relative pressure measuring instruments have a relative pressure measuring cell installed in a housing. The relative pressure measuring cell has, for example, a basic body and, arranged thereon, a pressure sensitive element, for example a diaphragm. The pressure p to be measured acts on a side of the pressure sensitive element averted from the basic body either directly or in a fashion transmitted by a pressure transmitter. The reference pressure $p_R$ acts on a side of the pressure sensitive element facing the basic body. The reference pressure $p_R$ is fed to the pressure sensitive element via a reference pressure feed, as a rule a bore that penetrates the basic body and opens in the housing.

The relative pressure measuring cell is customarily arranged on a support by which the housing is subdivided into a process-facing half and a process-averted half. During operation, the pressure p to be measured is fed through the process-facing half.

Arranged in the process-averted half is an electronic circuit for receiving, evaluating and/or processing electric signals generated by the relative pressure measuring cell.

The support preferably forms a pressure-proof separation that serves the purpose of preventing a medium whose pressure is to be measured from emerging.

However, in the case of a relative pressure measuring cell, it can happen that the pressure sensitive element is destroyed. In the case of relative pressure measuring instruments in which the reference pressure feed opens in the process-averted housing half, the reference pressure feed then effects a connection between the two housing halves. In the worst case, the medium destroys an electronic system located in the second housing half before it can output a fault message.

DE-690 15 367 T2 describes a reference pressure measuring instrument that has a cylindrical support that is enclosed in a cylindrical housing. The support is welded onto a process connection that is screwed into the housing. A reference pressure feed is provided that is led laterally out of the support and opens at a side wall of the support facing the housing. An annular cylindrical cavity between housing and support, into which the reference pressure feed opens, is sealed, on the one hand, by the thread of the process connection and, on the other hand, by a seal held between the housing and the support in a groove in the support.

If the medium emerges here through the reference pressure feed, it can flow off outwards through the thread only poorly. The medium will correspondingly have intimate contact with the seal. In the case of particularly aggressive media, it may be that the seal is damaged by the medium and loses its effect. In this case, the medium can penetrate again into the process-averted housing half.

U.S. Pat. No. 6,050,145 describes a relative pressure measuring instrument that is very similar to the relative pressure measuring instrument described in DE-690 15 367 T2. The support here is welded onto a pressure transmitter that is screwed into the housing. A reference pressure feed is provided that runs a short distance in the support in the process-averted direction, is then continued laterally and is finally led out of the support past the relative pressure measuring cell in the process-facing direction. Outside the carrier, the reference pressure feed is continued in the pressure transmitter and opens below the housing in the process-facing direction. If destruction of a separating diaphragm of the pressure transmitter and of the diaphragm of the pressure measuring cell occurs here, the medium is led out from the housing.

This type of reference pressure feed is, however, very complicated, since it requires a multiplicity of bores through the support (metallic as a rule) and the pressure transmitter, in order to construct the conduit system.

SUMMARY OF THE INVENTION

It is an object of the invention to provide a relative pressure measuring instrument having a reference pressure feed that offers a high measure of safety and is simple to produce.

For this purpose, the invention comprises a relative pressure measuring instrument having
  a relative pressure measuring cell
    having a pressure sensitive element,
      on whose process-facing side there is present during operation a pressure p to be measured,
      on whose process-averted side there is present during operation a reference pressure $p_R$ to which the pressure p to be measured is to be referred,
  a support
    on which the relative pressure measuring cell is arranged and
    which is enclosed in a housing,
  a process connection,
    that is connected to a process-facing end of the housing,
  a measuring instrument housing
    that is arranged at a process-averted end of the housing, and
  a reference pressure feed through which during operation the reference pressure $p_R$ is led to the process-averted side of the pressure sensitive element,
    and which leads completely out of the relative pressure measuring instrument laterally through the support and a single bore through the housing.

In accordance with one development, the support consists of glass. An electromechanical transducer is provided that serves the purpose of detecting a pressure dependent variation in the pressure sensitive element and converting it into a pressure dependent electrical variable that can be tapped via connecting lines. Contact pins connected to the connecting lines are glazed in and guided through into the process-averted half of the housing.

In accordance with one development, an adapter is provided that is connected to the housing and on which the measuring instrument housing is mounted.

In accordance with one development, the support consists of an insulator, and the pressure sensitive element is applied directly to the support.

In accordance with one refinement, there is inserted into the bore in the housing a filter that serves the purpose of preventing the intrusion of liquid and/or moisture.

In accordance with one refinement, the bore in the housing is provided with a cover that serves as splashwater guard.

In accordance with one refinement, at least one conduit section of the reference pressure feed has a smaller diameter and serves as flame barrier.

BRIEF DESCRIPTION OF THE DRAWINGS

The invention and further advantages are now explained in more detail with the aid of the figures of the drawing, in which two exemplary embodiments are illustrated; identical elements are provided in the figures with identical reference numerals.

DESCRIPTION OF THE PREFERRED EMBODIMENTS

Figure 1:
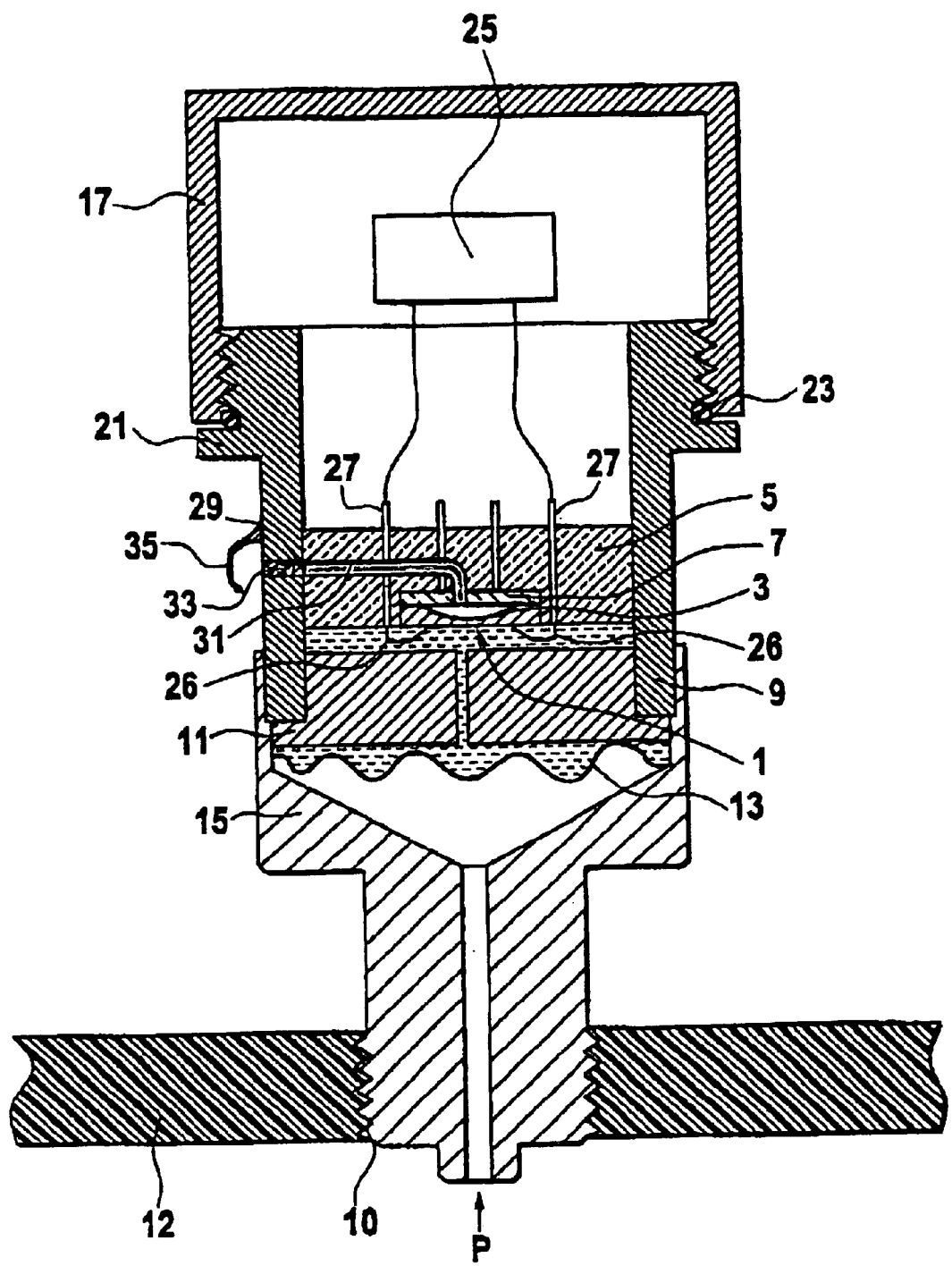
FIG. 1 shows a section through a relative pressure sensor according to the invention, having a reference pressure feed opening outside the housing.

FIG. 1 shows a section through a relative pressure measuring instrument according to the invention. The relative pressure measuring instrument has a relative pressure measuring cell 1 that has a pressure sensitive element 3. The relative pressure measuring cell 1 is arranged on a support 5.

Suitable as relative pressure measuring cell 1 is, for example, a semiconductor sensor, for example a silicon chip with resistance elements doped in. The silicon chip is designed here as a diaphragm and forms the pressure sensitive element 3. As illustrated in FIG. 1, it is applied to a basic body 7. The basic body 7 is, for example, a substrate made from glass or equally from silicon.

During operation, a pressure p to be measured is present on a process-facing side of the pressure sensitive element 3. Present, during operation, on a process-averted side is a relative pressure $p_R$ to which the pressure p to be measured is to be referred. A pressure dependent variation in the pressure sensitive element 3, here a deflection of the diaphragm, is therefore determined by a relative pressure p—$p_R$ that acts on it.

The support 5, on which the relative pressure measuring cell 1 is arranged is enclosed in the housing 9. The support 5 is disk-shaped in the exemplary embodiment illustrated, and the housing 9 is cylindrical. The support 5 preferably consists of glass. However, it is also possible to use supports made from metal. The housing 9 preferably consists of a metal, for example of a steel or stainless steel.

The support 5 is installed in a housing 9 in such a way that the housing 9 is subdivided into a first, process-facing and a second, process-averted, half. The support 5 preferably forms a pressure-proof separation between the two halves.

Connected to the process-facing first half, in which the pressure sensitive element 3 is located, is a pressure transmitter 11 via which a pressure p to be measured is transmitted to the diaphragm 3. The pressure transmitter 11 has a separating diaphragm 13 against which the pressure p to be measured bears during operation. Said pressure transmitter 11 is filled with a liquid, for example a silicone oil, that is as incompressible as possible and which transmits onto the pressure sensitive element 3 through a thin conduit a pressure p to be measured that acts on an outer separating diaphragm 13. The conduit preferably has so small a diameter that the conduit acts as a flame barrier.

Provided upstream of the pressure transmitter 11 is a process connection 15 that is connected to a process-facing end of the housing 9. In the exemplary embodiment illustrated, the process connection 15 is a substantially cylindrical component that is screwed onto the housing 9 and on whose housing-averted end there is integrally formed an external thread 10 that serves the purpose of fastening the pressure sensor at a measuring point, for example an opening in a container wall 12.

Alternatively, the process connection 15 can be connected by welding in one operation to the housing 9 together with the separating diaphragm 13 and a diaphragm bed that is possibly to be provided. If a diaphragm bed is dispensed with, the separating diaphragm 13 can also be welded directly onto the housing 9.

The process connection 15 has an uninterrupted central axial bore through which during operation a medium whose pressure is to be measured reaches the separating diaphragm 13 of the pressure transmitter 11.

A measuring instrument housing 17 is arranged at a process-averted end of the housing 9 opposite the process connection 15. Since the housing 9 is subdivided by the support 5 into two completely separate halves, the measuring instrument housing 17 can be mounted directly on the housing 9. The housing 9 has at the end an external thread 19 onto which the measuring instrument housing 17 is screwed until it rests on the shoulder 21 extending radially outwards and integrally formed on the housing 9. A seal 23 that rests on the shoulder 21 is provided between the housing 9 and the measuring instrument housing 17.

An electronic circuit 25 is provided in the measuring instrument housing 17. It serves, for example, to make up and/or process electrical measured variables generated during operation by the relative pressure measuring cell 1.

The relative pressure measuring cell 1 has an electromechanical transducer that serves the purpose of detecting a pressure dependent variation in the pressure sensitive element 3, here a deflection of the diaphragm, and to convert it into a pressure dependent electrical measured variable. If the pressure sensitive element 3 comprises a diaphragm made from a semiconductor, for example from silicon, the electromechanical transducer preferably has resistance elements which are doped into the diaphragm and whose electrical properties are a function of mechanical influences acting on it. In this case, either individual resistors can be used, or it is possible for a plurality of resistors to be combined, for example, to form a bridge circuit in the case of which, for example, a pressure dependent bridge voltage can be evaluated. The electrical variable can be tapped via connecting lines 26, for example bond wires. The connecting lines 26 are connected to contact pins 27 guided through the support 5.

In the case of a metal support, it necessary to provide glass bushings, for example, for this purpose. In the case of the glass support 5 provided here, the contact pins 27 are glazed directly into the support 5 and guided through the process-averted half of the housing 9 and connected there to the electronic circuit 25.

A reference pressure feed is provided through which during operation the reference pressure $p_R$ is led to the process-averted side of the pressure sensitive element 3. The reference pressure feed leads a short distance from a bore penetrating the basic body 7 in the process-averted direction into the support 5 and then laterally through the support 5 and a single bore 29 through the housing 9 completely out of the relative pressure measuring instrument.

The bore penetrating the basic body 7 has a first end that opens in a chamber formed by the pressure sensitive element 3 and the basic body 7. A second end of the bore opens at the support 5.

Running in the support 5 is a connection 31 through which the bore in the basic body 7 is continued to the outside through the support 5. In the case of a support made from metal, the connection 31 is to be implemented by two straight bores. In the case of a support 5 made from glass, the connection 31 can, by contrast, be a glazed tubelet, or a cutout can be provided in the glass. Such a cutout is, for example, produced by an appropriately shaped filling material that is removed from the support 5 after hardening of the glass.

Unlike in the prior art, the connection 31 is of very simple construction. It has at most two small straight bores, but preferably only one cutout or one glazed-in tubelet. It is possible thereby for the relative pressure feed to be produced very simply and cost effectively.

It is preferable to insert into the bore 29 in the housing 9 a filter 33, for example made from metal, polytetrafluoroethylene (PTFE) or a hydrophilic material. The filter 33 serves the purpose of preventing liquid and/or moisture from penetrating.

In addition, the bore 29 in the housing 9 is provided with a cover 35 that is fastened on an outer wall of the housing 9 and covers the bore 29 and serves as splashwater guard.

The reference pressure feed leads directly out of the housing 9. Even if the separating diaphragm 13 and the pressure sensitive elements 3 are now destroyed by an accident, no medium penetrates into the measuring instrument housing 17. The electronic circuit 25 is still protected even then and can output a fault message or an alarm. The accident is thereby discovered quickly, and the fault can be rectified before large amounts of medium emerge.

At least one conduit section of the reference pressure feed, for example the bore through the basic body 7 or the connection 31, preferably has a smaller diameter and thereby serves as flame barrier.

Figure 2:
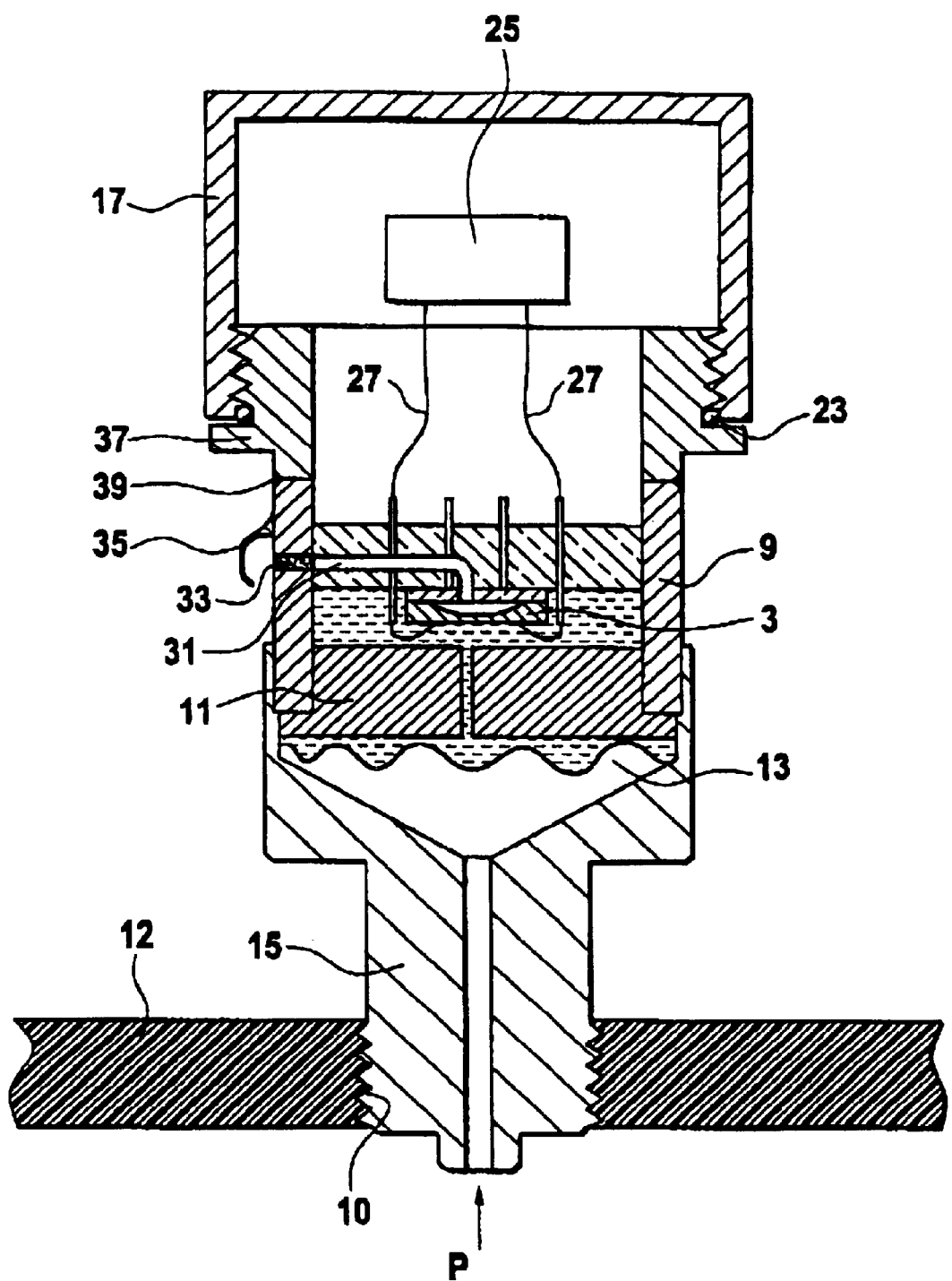
FIG. 2 shows a section through a relative pressure sensor according to the invention, having a reference pressure feed opening outside the housing, and a housing adapter.

FIG. 2 shows a further exemplary embodiment of a relative pressure measuring instrument according to the invention. Because of the extensive correspondence with the previous exemplary embodiment, only the differences that exist are explained in more detail below.

In the exemplary embodiment illustrated in FIG. 2, the housing 9 is cylindrical. An adapter 37 is permanently connected to the housing 9, for example by a weld 39. Exactly as in the case of the exemplary embodiment illustrated in FIG. 1, the measuring instrument housing is mounted on the adapter 37. This bipartite design with housing 9 and adapter 37 offers the advantage that it is possible to use various adapters, and various measuring instrument housing types can thereby be mounted without the need for modifications to the unit containing the relative pressure measuring cell.

In the exemplary embodiment illustrated in FIG. 2, the support 5 consists of an insulator, for example made from glass, and the pressure sensitive element 3 is applied directly to the support 5. The basic body 7 can always be permitted whenever the support 5 consists of an insulator. This design can, of course, also be used in conjunction with the exemplary embodiment illustrated in FIG. 1. Conversely, of course, it is also possible to use a basic body in the case of the exemplary embodiment illustrated in FIG. 2.

What is claimed is:

1. A relative pressure measuring instrument, having:

a relative pressure measuring cell having a pressure sensitive element, on whose process-facing side there is present during operation a pressure (p) to be measured, and on whose process-averted side there is present during operation a reference pressure ($p_R$) to which the pressure (p) to be measured is to be referred;

a support on which said relative pressure measuring cell is arranged and which is enclosed in a housing;

a process connection that is connected to a process-facing end of the housing; a a measuring instrument housing arranged at a process-averted end of the housing; and said reference pressure ($p_R$) is led to the process-averted side of said pressure sensitive element, and which leads completely out of the relative pressure measuring instrument laterally through said support and a single bore through the housing.

2. The relative pressure measuring instrument as claimed in claim 1, further having:

an electromechanical transducer which serves the purpose of detecting a pressure dependent variation in said pressure dependent element and converting it into a pressure dependent electrical variable that can be tapped via connecting lines; and contact pins connected to said connecting lines are glazed in and guided through into the process-averted half of the housing, wherein;

said support consists of glass.

3. The relative pressure measuring instrument as claimed in claim 1, further having:

an adapter connected to the housing and on which said measuring instrument housing is mounted.

4. The relative pressure measuring instrument as claimed in claim 2, wherein:

said support consists of an insulator, and said pressure sensitive element is applied directly to said support.

5. The relative pressure measuring as claimed in claim 1, further having: a filter inserted into said single bore in the housing that serves the purpose of preventing the intrusion of liquid and/or moisture.

6. The relative pressure measuring instrument as claimed in claim 1, wherein: said single bore in the housing is provided with a cover that serves as splashwater guard.

7. The relative pressure measuring instrument as claimed in claim 1, wherein: at least one conduit section of said reference pressure feed has a smaller diameter and serves as a flame barrier.

* * * * *